Oct. 9, 1951      G. L. SMITH      2,570,398

AUTOMATIC ADJUSTING MECHANISM FOR BRAKES

Filed March 15, 1948

INVENTOR

George L. Smith

BY *[signature]*

ATTORNEYS.

Patented Oct. 9, 1951

2,570,398

UNITED STATES PATENT OFFICE 2,570,398

AUTOMATIC ADJUSTING MECHANISM FOR BRAKES

George L. Smith, Washington, D. C., assignor to Thermo Brakes Corporation, Washington, D. C., a corporation of Virginia Application March 15, 1948, Serial No. 14,884

9 Claims. (Cl. 188—79.5)

My invention relates to automatic adjusting mechanism for brakes to compensate for the brake lining wear.

In addition to the provision of a thermostatically controlled adjuster as described in my U. S. Letters Patent No. 2,292,017 of August 4, 1942, I also provide a compact combination of an adjuster with the brake release spring, which occupies only a little more space than that required for the spring alone. The space inside conventional wheel brakes is very limited and it is often difficult to find extra room for automatic brake adjuster. Thus, in utilizing the space occupied by the brake release spring, I obtain a more compact arrangement of parts inside the brake drum.

In addition I provide protection for the thermostatic element to prevent its accidental deformation, and utilize the bi-metal blade as a ratchet pawl, thus reducing the number of parts.

Other objects of my invention will become apparent from the following description taken in connection with the accompanying drawing in which—

Figure 1:
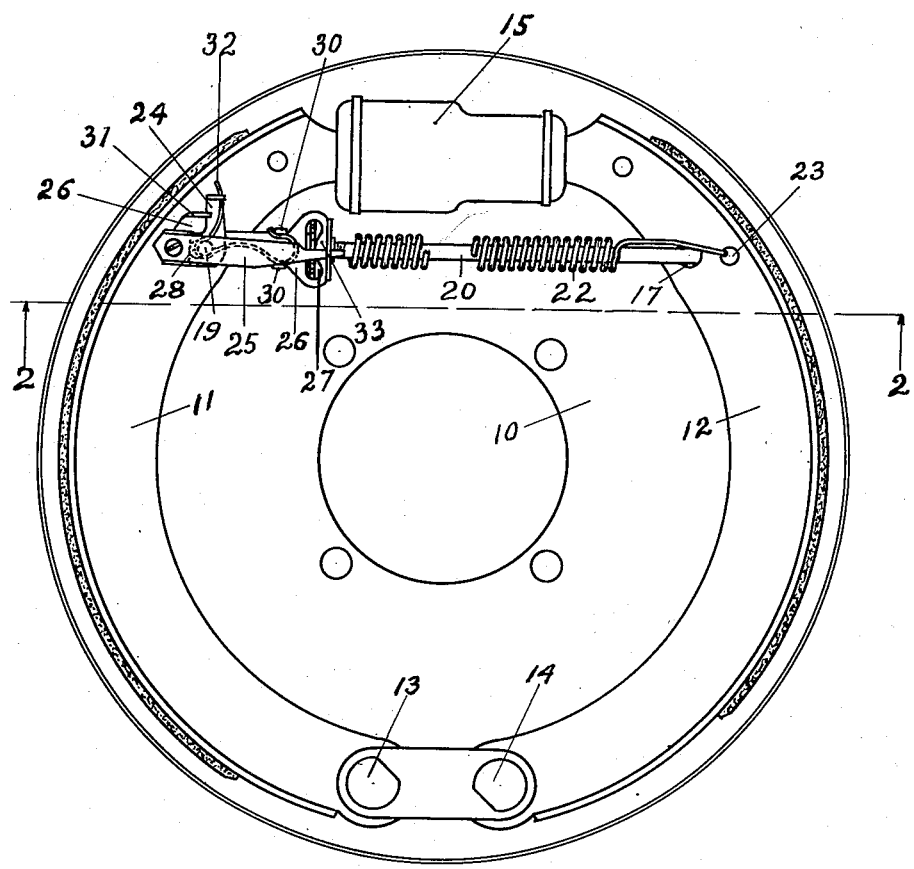
Fig. 1 shows a side elevation of a conventional brake mechanism with my adjuster attached thereto, and with the brake drum removed.

Referring to the drawing, which illustrates a preferred embodiment of the invention in detail, the backing plate 10 supports the two brake shoes 11, 12, for contacting the drum when pivoting about their anchor pins 13, 14 under the influence of hydraulic pressure exerted on the free ends of the shoes by the wheel cylinder 15 as is well known in brakes of the internal expanding type.

Figure 2:
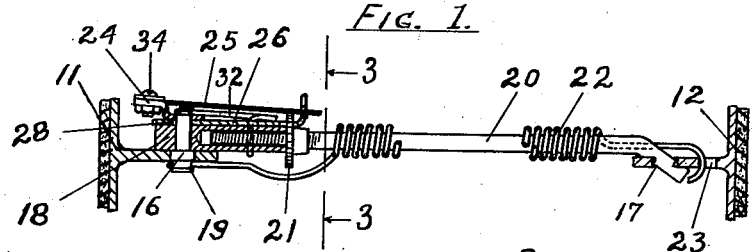
Fig. 2 shows a sectional view of the brake shoes and associated parts removed from the backing plate, taken on line 2—2 of Fig. 1.

Mounting holes 16 and 17 are provided in the webs of shoes 11 and 12 for my adjuster mechanism which is comprised of the following parts:

A socket 18 has a pin 19 press fitted into its left end as seen in the drawing and the lower end of this pin fits in the hole 16. A spacer rod 20 has its right end bent down and formed into a shape which fits in the hole 17 of the right shoe 12. Its left end, which is threaded and carries a ratchet wheel 21, extends into a longitudinal hole in the socket 18. The release spring 22 coils around the spacer rod and its right end hooks into the hole 23, while its left end hooks in a groove in the lower end of the pin 19, Fig. 2, having a sloping side which causes the spring to bind the socket 18 against the web of shoe 11. This places the rod 20 in compression and holds the two shoes properly spaced to clear the brake drum, locks the socket to its shoe, and prevents any looseness or rattling in service.

To extend this spacer linkage, 18, 20, I pivot on the upper end of the pin 19 a pawl 24 which includes a bi-metal blade 25 forming the long arm of said pawl and positioned to engage the teeth of the ratchet wheel 21. Preferably the blade is forged from nickel and carbon steel and is sufficiently hard to resist wear as it chafes against the teeth of the ratchet wheel. When hot the pawl disengages the ratchet wheel and cannot rotate it when the brake is released because the high expansion side of the blade is next to the wheel causing it to bend away therefrom.

Figure 3:
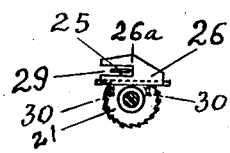
Fig. 3 shows a sectional view taken on line 3—3 of Fig. 2; both sectional views looking in the direction of the respective arrows.

To operate the pawl I provide a sliding member 26 having an opening 27 through which the ratchet wheel 21 extends and provided with an abutment on its right hand side against which the side of the ratchet wheel engages as hereinafter described, and an elongated slot 28 for receiving the pin 19 permits limited movement of this sliding member 26 with respect to the socket 18 and the pawl 24. The right end of the member is bent up as shown at 26a (Fig. 3) and has an open ended slot 29 into which the blade 25 projects. This prevents accidental bending of the blade away from the wheel 21. Ears 30, 30 are bent down on each side around the block 18 to keep the member 26 in line with the block as it moves to the right when the brake is applied and the rod 20 with its ratchet wheel moves axially in the hole in socket 18 by the amount needed to apply the brake. The left end of member 26 has a lip 31 which is bent up and slotted to engage the arm of pawl 24 so that, when the member 26 moves to the right it causes the pawl 24 to rotate clockwise on the pin 19. To move it in the opposite direction, and at the same time hold the parts in place, I provide a spring 32 which is bent around a groove in the upper end of pin 19 with its vertical portion as seen in Fig. 1 engaging the vertical arm of pawl 24. Its right end is bent to form a loop which holds member 26 down and the end runs down the side of and hooks under the socket 18.

The mechanism operates as follows: When the brake is applied the shoes swing outward and contact the drum. This pulls rod 20 out of the hole in socket 18 by an amount which corresponds to the allowed running clearance of the shoes, unless the shoes have worn enough to permit abnormal depression of the brake pedal. The wheel 21 which bears on the abutment 33 of the member 26 thus moves the latter to the right and the lip 31 exerts a force on the pawl 24 to rotate it in a clockwise direction against the pressure of the spring 32. If the brake parts are cool and the running clearance has become too great the blade 25 will engage the next tooth on wheel 21. When the brake is released the spring 32 will rotate the pawl in a counter-clockwise direction and rotate the ratchet wheel through an angle corresponding to one tooth. If the brake becomes hot from prolonged application, then the blade 25 will bend away from the wheel and will not contact a new tooth even if the clearance is abnormal, thus the adjusting action is arrested and the danger of over adjustment when the parts cool is prevented. When the parts are not hot enough for the blade 25 to bend out of contact with the wheel 21 each repeated application of the brake will cause the blade to move back and forth upon the teeth of the wheel, tending to cause chafing, as it is only occasionally that the blade will move far enough to pick up the next tooth.

To remove the adjuster, the spring 22 is unhooked from the hole 23, then moved to the left and unhooked from the pin 19. Then the socket 18 can be moved sidewise to withdraw pin 19 from hole 16 so that the rod 20 can be withdrawn from hole 17. It will be noted that the adjuster can be shifted end for end so that the rod will enter hole 16 and the pin 19 will engage hole 17, without changing the relative position of the blade 25 with respect to the drum and without changing the effect of the heat of the drum upon the operation of the device.

I show the blade 25 secured to the pawl 24 by a small machine screw 34 but this is necessary only when it is desired to remove the blade from the pawl. If capacity for removal is not considered necessary, then these parts can be either riveted or welded together.

The offset end of pawl 24 which receives the blade 25 permits the latter to pass over the head of pin 19 and also permits the mechanic to check and adjust the position of the blade with respect to the wheel 21. If not correct, this off-set end can be bent up or down as necessary, without bending the blade itself. Bending of the blade to accomplish this is not practicable as it would require annealing after bending.

While I have shown and described my adjuster as applied to one conventional type of brake, it can be applied to any type of brake having an extensible spacer link for adjusting it and I do not intend to limit the scope of my invention to the embodiment herein described.

I claim the following as my invention:

1. In an automatic brake adjusting mechanism connecting the two shoes of an internal expanding brake, an extensible spacer link, a ratchet wheel for extending said link, a ratchet pawl having a bi-metal blade positioned to engage the teeth of said wheel with its high expansion side next to said wheel, means interconnecting said pawl and said wheel and operated by the extension of said link for moving said pawl in a direction to engage a new tooth on said wheel and a spring connected to said pawl for operating it in the reverse direction.

2. In an automatic brake adjusting mechanism connecting the two shoes of an internal expanding brake, an extensible spacer link, a brake release spring interconnecting said shoes coiled around said link and binding one end of said link to one of said shoes, a ratchet wheel operable to extend said link, a ratchet pawl engaging the teeth of said wheel and having a bi-metal blade movable under the application of heat to disengage said pawl from said wheel, means interconnecting said pawl with said wheel and operated by the extension of said link to move said pawl in one direction and a spring moving said pawl in the other direction upon contraction of said brake under the influence of said release spring.

3. An automatic brake adjusting mechanism for connecting the two shoes of an internal expanding brake comprising an extensible spacer link, a socket housing one end of said link, a ratchet wheel rotatable to extend said link, a thermostatically controlled ratchet pawl mounted on said socket and carrying a bi-metal blade for engaging the teeth of said wheel, means on said socket interconnecting said pawl and said wheel and operated by extension of said link for moving said pawl in one direction and a spring connected to said pawl for moving it in the reverse direction.

4. An automatic brake adjusting mechanism for connecting the two shoes of an internal expanding brake comprising an extensible spacer link, a socket housing one end of said link, a ratchet wheel on said link and bearing against said socket to limit relative movement thereof in adjusting direction, said ratchet wheel being rotatable to extend said link, a member engaging said ratchet wheel and slidable on said socket, a pawl pivoted on said socket, said pawl carrying a thermostatic blade the free end of which is adapted to engage said ratchet wheel, and an arm on said slidable member engaging said pawl to swing it transversely of the axis of said link when said link is moved axially with respect to said socket.

5. An automatic brake adjusting mechanism for connecting two shoes of an internal expanding brake comprising an extensible spacer link, a socket housing one end of said link, a ratchet wheel rotatable to extend said link, and bearing against the open end of said socket, a bi-metal ratchet pawl mounted on said socket and engaging the teeth of said ratchet wheel, means interconnecting said pawl and said wheel and operated by expansion of said brake for moving said pawl in one direction, and a spring connected to said pawl for moving it in the reverse direction.

6. In an automatic brake adjusting device constituting a part of an internal expanding brake mechanism, an extensible adjusting member carried by one of the brake shoes, a ratchet wheel screw threaded on said member for adjusting it with respect to its shoe, a ratchet pawl pivoted on said mechanism and having a bimetal blade extending to said ratchet wheel and directly contacting the teeth of said wheel when cool, but disengaged therefrom when hot, and means actuated by brake application and release for oscillating said pawl.

7. An internal expanding brake mechanism including a rotating brake drum, a movable brake shoe mounted within said drum, and means for applying said shoe against said drum, in combination with an extensible member connected to said shoe and having a threaded portion, a ratchet nut member rotatable on said threaded portion to adjust it with respect to said shoe, a ratchet pawl pivoted on said mechanism alongside said extensible member and having a bimetal blade overlying said ratchet wheel to engage its teeth when cool and adapted to disengage its teeth when hot, said pawl having an actuating arm connected to it, and means engaging said pawl arm to swing said pawl on its pivot whenever said brake shoe is actuated to engage said drum, said means returning said pawl to its normal position when said brake shoe returns to off position, and means for returning said brake shoe to off position.

8. An internal expanding brake mechanism as set forth in claim 7 wherein spring means is provided for returning the brake shoe to off position and the ratchet pawl to normal position.

9. An automatic brake adjusting mechanism for an internal expanding brake having a shoe adapted to engage within a rotating drum, said mechanism comprising an extensible spacer member, a socket on said shoe housing one end of said member, a ratchet wheel on said member and bearing against said socket to limit relative movement thereof in adjusting direction, said ratchet wheel being rotatable to extend said member, a pawl pivoted on said socket, said pawl carrying a bi-metal blade the free end of which is adapted to engage said ratchet wheel, and an arm engaging said pawl to swing it transversely of the axis of said member when said member is moved axially with respect to said socket.

GEORGE L. SMITH.

REFERENCES CITED

The following references are of record in the file of this patent:

UNITED STATES PATENTS

| Number | Name | Date |
|---|---|---|
| 2,046,420 | La Brie | July 7, 1936 |
| 2,124,784 | La Brie | July 26, 1938 |
| 2,140,219 | Clench | Dec. 13, 1938 |
| 2,243,469 | Moore | May 27, 1941 |
| 2,292,017 | Smith | Aug. 4, 1942 |
| 2,308,885 | MacDuff | Jan. 19, 1943 |
| 2,322,061 | Schnell | June 15, 1943 |